US012762505B2

(12) United States Patent
Sanwaliya et al.

(10) Patent No.: US 12,762,505 B2

(45) Date of Patent: Oct. 13, 2026

(54) METHOD FOR OPTIMIZING A SHIPPING ROUTE AND RELATED ELECTRONIC DEVICE

(71) Applicant: MAERSK A/S, Copenhagen (DK)

(72) Inventors: Abhishek Sanwaliya, Bangalore (IN); Sunil Kumar Chinnamgari, Bangalore (IN)

(73) Assignee: Maersk A/S, Copenhagen K (DK)

( * ) Notice: Subject to any disclaimer, the term of this patent is extended or adjusted under 35 U.S.C. 154(b) by 261 days.

(21) Appl. No.: 18/262,097

(22) PCT Filed: Jan. 27, 2022

(86) PCT No.: PCT/EP2022/051949

§ 371 (c)(1),
(2) Date: Jul. 19, 2023

(87) PCT Pub. No.: WO2022/162092

PCT Pub. Date: Aug. 4, 2022

(65) Prior Publication Data

US 2024/0303589 A1 Sep. 12, 2024

(30) Foreign Application Priority Data

Jan. 29, 2021 (DK) ............................ PA202170045

(51) Int. Cl.
*G06Q 10/083* (2024.01)
*G06Q 10/047* (2023.01)
(Continued)

(52) U.S. Cl.
CPC ..... *G06Q 10/08355* (2013.01); *G06Q 10/047* (2013.01); *G06Q 10/0831* (2013.01); *G06Q 30/018* (2013.01)

(58) Field of Classification Search
CPC .......... G06Q 10/08355; G06Q 10/047; G06Q 10/0831; G06Q 30/018; G01C 21/203
See application file for complete search history.

(56) References Cited

U.S. PATENT DOCUMENTS

2010/0145569 A1* 6/2010 Bourque ............ G01C 21/3469 701/31.4
2010/0185471 A1 7/2010 Chen et al.
(Continued)

FOREIGN PATENT DOCUMENTS

CN 104508427 A 4/2015
CN 111144601 A 5/2020
(Continued)

OTHER PUBLICATIONS

International Search Report and Written Opinion dated Apr. 29, 2022 for International PCT Application No. PCT/EP2022/051949.
(Continued)

*Primary Examiner* — Jessica Lemieux
*Assistant Examiner* — Alaa Wadie Hussein
(74) *Attorney, Agent, or Firm* — Fish & Richardson P.C.

(57) ABSTRACT

Disclosed is a method, performed by an electronic device, for optimizing a shipping route. The method comprises obtaining operational input data comprising a source data element and a destination data element. The method comprises obtaining based on the operational input data and a route optimization model, an optimized route set comprising a route parameter associated with a carbon emission parameter. The route optimization model is based on historical route data. The method comprises outputting, based on the optimized route set, a result indicative of an optimized route.

19 Claims, 5 Drawing Sheets

| Source Port | Destination Port | Lat-LoNg | From Terminal | To Terminal | To Port Code | Distance to Port | ETA |
|---|---|---|---|---|---|---|---|
| BARCELONA | SINGAPORE | 41.38334, 2.18334 | BEST TERMINAL CATALUNYA | PSA SINGAPORE TERMINAL | SGSINPS | 6632 | 27/09/19 21:42 |
| TANUNG PELEPAS | NINGBO | 1.4051, 10.593 | PLEABUHAN TANJUNG PELEPAS TERMINAL | BEILUN CONTAINER TERMINAL PHASE 4 | CNNPOJ4 | 2105 | 22/07/19 10:02 |
| TANUNG PELEPAS | TAWAIJ | 1.4051, 10.593 | PLEABUHAN TANJUNG PELEPAS TERMINAL | TAWAIJ TERMINAL | MYTWUTM | 1288 | 10/06/19 14:27 |
| LE HAVRE | FREEPORT | 49.49, 0.125 | TN MSC 2000 | FREEPORT TERMINAL | BSEPOPT | 4804 | 23/09/19 19:42 |
| DAKAR | PORT SAID EAST | 14.684, -17.446 | DAKAR PORT | EAST PORT SAID TERMINAL | EGPSDTM | 3425 | 12/12/19 21:07 |
| POHANG | VLADIVOSTOK-SOLLERS | 36.036, 129.37 | POHANG INTL CONTAINER TERM, PICT | VLADVIOSTOK-SOLLERS TERMINAL | RUPLOTM | 449 | 17/03/19 17:22 |

(51) Int. Cl.
*G06Q 10/0831* (2023.01)
*G06Q 30/018* (2023.01)

(56) References Cited

U.S. PATENT DOCUMENTS

| | | | | |
|---|---|---|---|---|
| 2012/0023032 | A1* | 1/2012 | Visdomini ....... | G06Q 10/08355 705/338 |
| 2018/0003516 | A1 | 1/2018 | Khasis | |
| 2018/0043976 | A1 | 2/2018 | Nakamoto et al. | |
| 2019/0107408 | A1 | 4/2019 | Stroman et al. | |
| 2019/0114587 | A1* | 4/2019 | Asifullah ............. | G06Q 10/047 |
| 2020/0142407 | A1 | 5/2020 | Kozloski et al. | |
| 2020/0240787 | A1* | 7/2020 | Jha .......................... | B63B 49/00 |
| 2021/0348926 | A1* | 11/2021 | Dokken .................. | B63B 79/20 |
| 2024/0354666 | A1* | 10/2024 | Jordi Ballester .... | G06Q 10/083 |

FOREIGN PATENT DOCUMENTS

| | | | |
|---|---|---|---|
| CN | 111428931 | A | 7/2020 |
| CN | 107292451 | B | 11/2020 |
| EP | 3644014 | A1 | 4/2020 |

OTHER PUBLICATIONS

Danish Search report dated Jul. 30, 2021 for Denmark Application No. PA202170045.
Office Action in Chinese Appln. No. 202280012058.0, mailed on Apr. 15, 2026, 14 pages (with English translation).

* cited by examiner

| Source Port | Destination Port | Lat-LoNg | From Terminal | To Terminal | To Port Code | Distance to Port | ETA |
|---|---|---|---|---|---|---|---|
| BARCELONA | SINGAPORE | 41.38334, 2.18334 | BEST TERMINAL CATALUNYA | PSA SINGAPORE TERMINAL | SGSINPS | 6632 | 27/09/19 21:42 |
| TANUNG PELEPAS | NINGBO | 1.4051, 10.593 | PLEABUHAN TANJUNG PELEPAS TERMINAL | BEILUN CONTAINER TERMINAL PHASE 4 | CNNPOJ4 | 2105 | 22/07/19 10:02 |
| TANUNG PELEPAS | TAWAIJ | 1.4051, 10.593 | PLEABUHAN TANJUNG PELEPAS TERMINAL | TAWAIJ TERMINAL | MYTWUTM | 1288 | 10/06/19 14:27 |
| LE HAVRE | FREEPORT | 49.49, 0.125 | TN MSC 2000 | FREEPORT TERMINAL | BSEPOPT | 4804 | 23/09/19 19:42 |
| DAKAR | PORT SAID EAST | 14.684, -17.446 | DAKAR PORT | EAST PORT SAID TERMINAL | EGPSDTM | 3425 | 12/12/19 21:07 |
| POHANG | VLADIVOSTOK-SOLLERS | 36.036, 129.37 | POHANG INTL CONTAINER TERM, PICT | VLADVIOSTOK-SOLLERS TERMINAL | RUPLOTM | 449 | 17/03/19 17:22 |

Fig. 1

METHOD FOR OPTIMIZING A SHIPPING ROUTE AND RELATED ELECTRONIC DEVICE

CROSS-REFERENCE TO RELATED APPLICATIONS

This application is a 371 of International Application No. PCT/EP2022/051949, filed Jan. 27, 2022, which claims priority to Denmark Application No. PA202170045 filed Jan. 29, 2021 under 35 U.S.C. § 119(a). Each of the above-referenced patent applications is incorporated by reference in its entirety.

The present disclosure pertains to the field of transport and freight. The present disclosure relates to a method for optimizing a shipping route and related electronic device.

BACKGROUND

Routing approaches simply recommend route based on distance and required arrival time (RAT). There is a need for considering the impact on the environment.

SUMMARY

Considering the impact on the environment when determining a route may include a determination of a carbon footprint, such as a carbon emission parameter. External factors like weather fluctuations and/or variability, fuel consumption have an impact on resulting carbon emissions. There is a need for an electronic device and a method that may provide an optimal route considering the operational as well as the environmental impact as constraints.

Accordingly, there is a need for an electronic device and a method for optimizing a shipping route, which mitigate, alleviate or address the existing shortcomings and provide safety (such as best route to sail in troubled weather) and cost effectiveness while ensuring a reduced impact on the environment of a shipping route.

Disclosed is a method, performed by an electronic device, for optimizing a shipping route. The method comprises obtaining operational input data comprising a source data element and a destination data element. The method comprises obtaining based on the operational input data and a route optimization model, an optimized route set comprising a route parameter associated with a carbon emission parameter. The route optimization model is based on historical route data. The method comprises outputting, based on the optimized route set, a result indicative of an optimized route.

Further, an electronic device is disclosed. The electronic device comprises memory circuitry, processor circuitry, and an interface. The electronic device is configured to perform any of the methods disclosed herein.

Disclosed is a computer readable storage medium storing one or more programs, the one or more programs comprising instructions, which when executed by an electronic device with a display and a touch-sensitive surface cause the electronic device to perform any of the methods disclosed herein.

It is an advantage of the present disclosure that the disclosed electronic device and method provide an optimal route considering operational as well as environmental impact. The disclosed technique provides a result for a shipping route that provides safety (such as best route to sail in troubled weather) and cost effectiveness while also ensuring a reduced impact on the environment. For example, a shipping system, such as a freight system for e.g., vessel, boat, car, truck, plane, can use the result indicative of the optimized route to make a safe arrival at port with an optimal navigation and reduced carbon emission. It may be appreciated that the disclosed technique may lead to a shipping route with a reduced, such as minimized, carbon emission while also maintaining other important variables. The disclosure provides efficient route optimization that can be replicated across various verticals and/or operations globally for optimal route estimation.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which:

FIG. 1 is a table diagram illustrating an example representation of an example information illustrating operational input data according to this disclosure.

DETAILED DESCRIPTION

Figure 2:
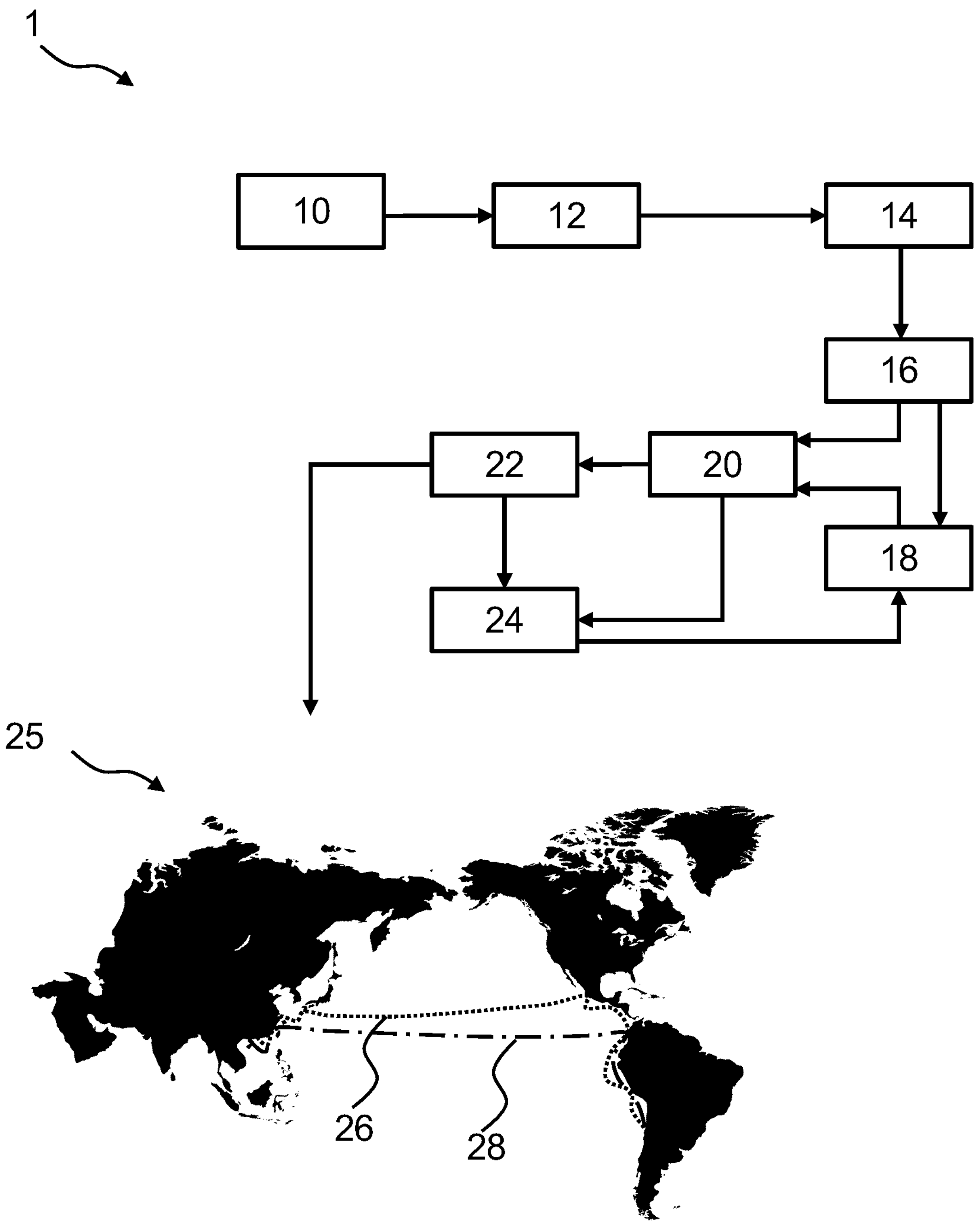
FIG. 2 is a diagram illustrating schematically a process where the disclosed technique is carried out by an example electronic device according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

Disclosed herein are one or more exemplary methods for optimizing shipping routes. A given shipping route can be optimized or modified, such as based on previous historical shipping routes, in order to improve environmental impact, such as by reducing carbon emissions. In one or more exemplary methods, this modification or optimization can be performed while also maintaining particular booking constraints, such as cargo size, necessary ports, safety, etc. Thus, environmental impact can be taken into account for a particular shipping, while maintaining the necessary operational requirements.

Further, one or more disclosed methods can allow for modification or optimization of the shipping route while the shipping is occurring. Therefore, a particular shipping may not be so limited by the original shipping route if one or more variables change along the way. This provides flexibility and fluidity to the shipping, improving overall results.

FIG. 1 shows a table diagram illustrating an example representation of an example information illustrating operational input data according to this disclosure.

The operational input data may comprise a source data element indicative of a source port, such as one or more source ports as illustrated in the examples of FIG. 1. In other words, the source data element may be indicative of a source port, such as a source port name and/or a source port number, where a voyage may start for shipping, or may be an intermediate port.

The operational input data may comprise a destination data element indicative of a destination, such as one or more destination ports as illustrated in the examples of FIG. 1. In other words, the destination data element may be indicative of a destination port, such as a destination port name and/or a destination port number, where the voyage may end or may be an intermediate port.

The operational input data may comprise a coordinate data element indicative of position coordinates, such as latitudinal and longitudinal coordinates, such as a Lat-Long as illustrated in the examples of FIG. 1. In one or more examples, the coordinate data element may be indicative of geolocation coordinates, such as latitude and/or longitude.

The operational input data may comprise a source terminal data element indicative of a source terminal, such as a name and/or number of a source terminal, such as "From terminal" illustrated in the examples of FIG. 1.

The operational input data may comprise a destination terminal data element indicative of destination terminal, such as name and/or number of a destination terminal, such as "To Terminal" illustrated in the examples of FIG. 1.

The operational input data may comprise a port code data element indicative of port code, such as a name and/or number of a port, such as "To Port Code" illustrated in the examples of FIG. 1.

The operational input data may comprise a distance data element indicative of a distance to the destination port, such as a typically distance following the shipping route, such as "Distance to Port" illustrated in the example of FIG. 1. The distance may be expressed in kilometres, KM, or any other unit.

The operational input data may comprise an estimated time of arrival data element indicative of estimated time of arrival, such as a date and/or a time of arrival at destination port, such as ETA illustrated in the examples of FIG. 1.

The operational input data may be indicative of operational constraints on the shipping route. The operational data may comprise one or more constraint data elements. A destination data element, a source data element, a source terminal data element, and/or a destination terminal data element may be seen as one or more constraint data elements.

The operational input data may comprise one or more constraint data elements indicative of constraints associated with equipment (such as container and/or equipment details, such as equipment type and/or size), and/or with a commodity shipped, and/or with a cost parameter, and/or with a bunker consumption.

FIG. 2 shows a diagram illustrating an example process 1 of embodiments for optimizing a shipping route, carried out by an example electronic device, according to this disclosure.

The input data 10 may comprise one or more of: historical input data, and operational input data. The operational input data may comprise movement data of the shipment, such as vessel movement data, optionally along with the operational constraints. The historical route data may be seen as previous route data for vessels across a time period (e.g. a broad time period) prior to the present time.

The input data 10 comprising historical input data is fed to step 12 related to a pre-processing step to obtain historical route data, such as transforming the historical input data to expand the historical route data.

The transformation step 12 may provide the expanded historical route data to a filtering step 14 related to filtering the historical route data based on proximity.

The step 14 provides one or more filtered routes to a candidate route selection step 16 for selecting or extracting one or more candidate routes based on delivery time and/or route leg information.

The step 16 provides one or more selected candidate routes to a route optimization model 20. The route optimization model 20 determines, based on operational input data, an optimized route set comprising a route parameter associated with a carbon emission parameter. The route optimization model is based on the historical route data. A confidence score may be associated with the carbon emission parameter. Determining the optimized route set may comprise determining an operational parameter for the route parameter.

Step 18 may provide operational input data.

The route optimization model 20 may receive operational input data from step 18. The operational input data may comprise booking data and/or temporal data indicative of an environmental condition (e.g. wind speed, temperature, air density, humidity, tidal strength, tide height, icing conditions) for a geographic area.

In some examples, the booking data may comprise data indicative of one or more of container equipment size, equipment type, commodity shipped, cost details, delivery time, source port, destination port, and bunker fuel consumption. In some examples, the temporal data may comprise one or more of a maritime parameter, an air travel parameter and a weather parameter. In some examples, the temporal data may comprise geolocation data, such as latitude data, and/or longitude data. In some examples, obtaining operational input data comprises obtaining updated temporal data along the shipping route. As the operational input data is obtained dynamically, the operational input data may be transformed and filtered by retaining observations with highest proximity with nearby port and navigational points.

The route optimization model 20 determines the operational parameter for the route parameter, e.g. indicative of a determined route. In some examples, the route parameter comprises one or more of: a waypoint parameter, a distance parameter, and an estimated time of arrival, and a set of intermediate stops.

The route optimization model 20 determines the optimized route set based on the operational parameter satisfying a first criterion. In some examples, the first criterion is based on one or more of operational constraints associated with the operational input data (e.g. the second input from step 18). The step 20 may provide the optimized route set comprising one or more optimized routes with corresponding route parameter, carbon emission parameter, and optionally a confidence score to step 22. For example, the optimized route set may comprise a first route parameter, a first carbon emission parameter associated with the first route parameter, a second route parameter and a second carbon emission parameter associated with the second route parameter. The optimized route set may include a difference or delta estimate between the first carbon emission parameter and the second carbon emission parameter. For example, when the first carbon emission parameter is 12.5 and the second carbon emission parameter is 17, 5, the difference or delta estimate is 5. In one or more examples, the optimized route set may include a first route parameter associated with the best (e.g. lowest) carbon emission parameter, and a second route parameter associated with the next best carbon emission parameter. The first route parameter may indicate a first route, such as route 28. The second route parameter may indicate a second route different from the first route. For example, the second route may be route 26. In one or more examples, the difference or delta estimate may be between the best carbon emission parameter and the next best carbon emission parameter. In one or more example, the route 28 may be seen as an optimized route with lower carbon emission parameter than the route 26.

In some examples, when an operational parameter of a shipping route does not satisfy the first criterion in step 20, then the route parameter associated with that shipping route may be included into a fine-tuning data set 24. Then the fine-tuning data set may be passed in put to a data fine tuning step, such as step 18 for fine tuning the route optimization model.

In some examples, step 22 provides result 25 based on the carbon emission parameter associated with a shipping route provided in the optimized route set satisfying the second criterion. When the second criterion is satisfied then the route parameter may be included into the result 25. For example, when the carbon emission parameter doesn't satisfy the second criterion, then the route parameter associated with that shipping route may be included into a fine-tuning data set 24. The fine-tuning data set may be used for fine-tuning the route optimization model.

The technique/process may consider routing mechanisms such as shortest path, and or dynamic route optimization (elaborated in FIG. 3) to dynamically determine the optimized data set along the shipping route. For example, the temporal data set indicative of an environmental condition for a geographic area may change along the shipping route then the route optimization model 20 updates the optimized route dynamically. This may occur as different environmental conditions can affect carbon emissions.

The disclosed technique may be seen as a technique enabling automated optimized route generation with least carbon emissions under operational constraints. The disclosed technique may be trained with multiple routing mechanisms such as shortest path, and or dynamic route optimization.

Figure 3:
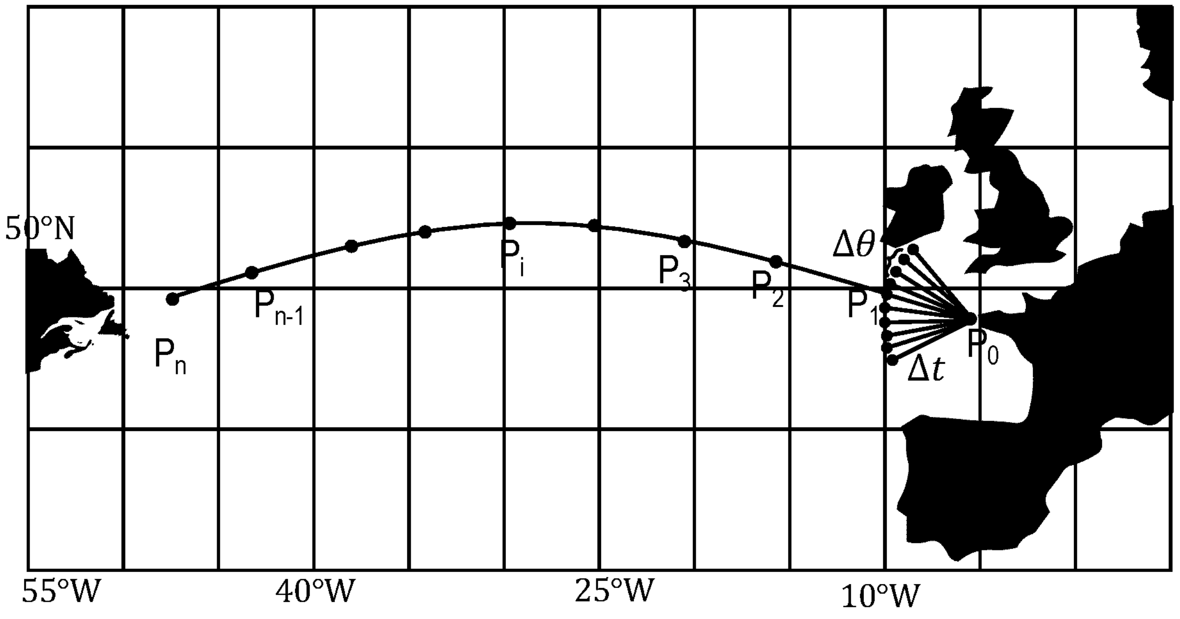
FIG. 3 is a diagram illustrating an example route trajectory schematic representation for dynamically generating an optimized route according to this disclosure

FIG. 3 shows an example route trajectory schematic representation for dynamically generating an optimized route according to this disclosure.

FIG. 3 shows a series of waypoints P (e.g. forming a vessel's pathway projection) and their associated timestamp of passing. The waypoint and time may be used to calculate vessel's operational condition (U).

A waypoint with time location and time may be expressed as: $P_i=[x, y, t]^T$

Operational parameters (such as operational control variables) may be expressed as: $U(P_i)=[u, \theta]$ A weather condition (such as an encountered meteorological MetOcean condition) may be expressed as: $W(P_i)=[\text{Wave, Wind, current} \ldots]$ A trajectory of a shipping route may be expressed as: $\vec{P}=[P_0, P_1, \ldots, P_n]$ Ship state variables may be expressed as: $P=[x, y, t]^T$ where x, y, t represents longitude, latitude and time respectively.

Ship control variables may be expressed as: $U(P_i)=[v, \theta]^T$ where v is the ship velocity and θ is its heading angle to form a ship's operational condition in one ship state P. Weather conditions may be expressed as: $W(P)=[H_s, T_p, C, V_{wu}, V_{wv}, \ldots]^T$ representing ocean waves $[H_s, T_p, S_w(H_s, Tp)]$, current C, and wind parameters $[V_{wu}, V_{wv}]$, etc., for a ship state P, where Hs denotes a humidity parameter indicative of humidity, Tp denotes a temperature parameter indicative of temperature, and Sw denotes a parameter indicative of speed of a wave.

Ship sailing constraints may be expressed as: $C(\vec{P}, U(\vec{P}))$, which includes ship sailing constraints such as geometric constraints, control constraints (land crossing constraints, marine engine power constraints, etc.). The function may return a Boolean value that indicates the feasibility of the sailing conditions, i.e., $\vec{P}$ and $U(\vec{P})$.

An extracted path $\vec{P}$ may be further evaluated by estimating the carbon emission e.g. based on following estimate:

Emissions: 10-15 grams per ton per kilometer

Average weight: 2,00,000 tons

Average Speed: 19 knots

A carbon emission parameter may be expressed as: (Average weight×Emissions in grams per ton per kilometer×distance)/(1000×1000) tons. However, other carbon emission parameters may be used, and the disclosure is not limited by the above.

Operational input data may comprise data indicative of the ship sailing constraints, and/or the ship state variables.

Figure 4:
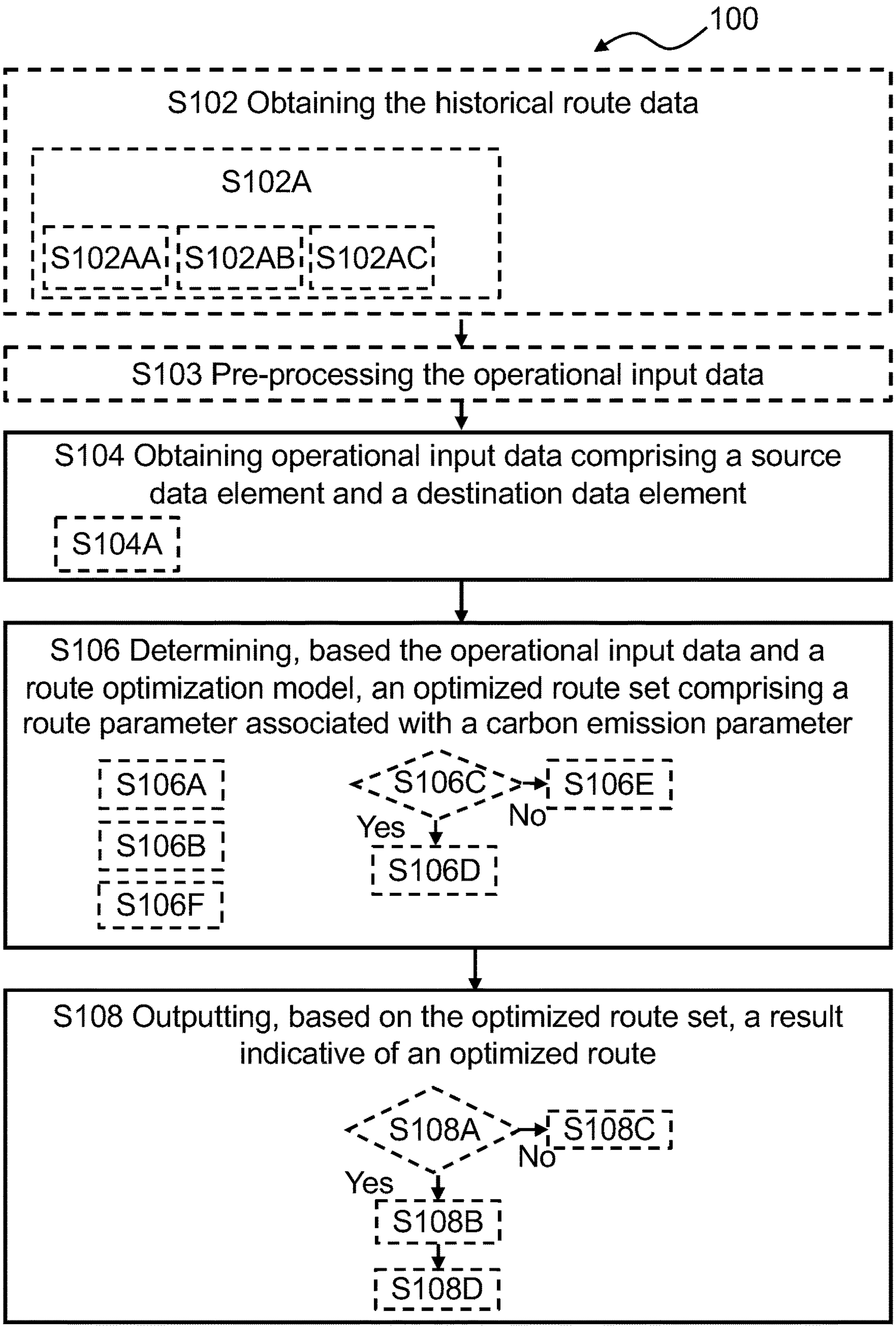
FIG. 4 is a flow-chart illustrating an exemplary method, performed by an electronic device, for optimizing a shipping route according to this disclosure.
Figure 5:
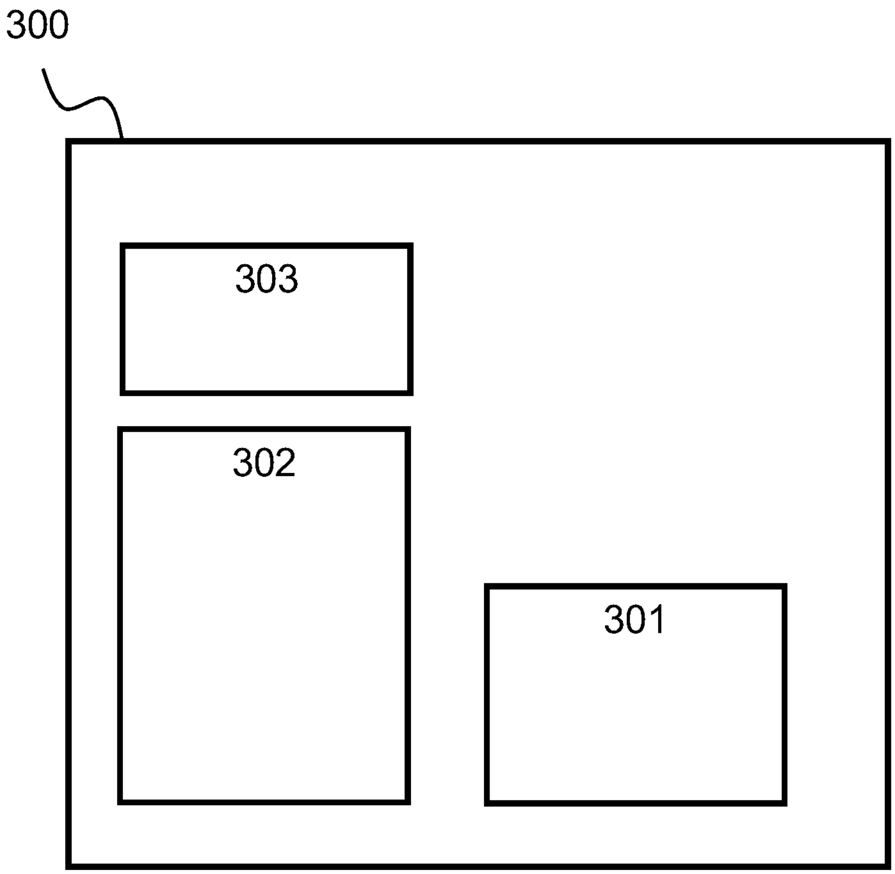
FIG. 5 is a block diagram illustrating an exemplary electronic device according to this disclosure.

FIG. 4 is a flow chart illustrating an example method 100, performed by an electronic device (such as the electronic device disclosed herein, such as electronic device 300 of FIG. 5), for optimizing a shipping route.

The method 100 comprises obtaining S104 operational input data comprising a source data element and a destination data element (for example receiving and/or retrieving the operational input data). In one more example methods, the operational input data is indicative of operational constraints on the shipping route. In one more example methods, the operational constraints comprise one or more of a destination port, a source port, and ship sailing constraints, such as geometric constraint, and/or control constraints, e.g. illustrated in FIG. 3. In one or more example methods, the obtaining S104 comprises obtaining S104A updated temporal data along the shipping route. In other words, the temporal data may be obtained dynamically along the shipping route. Thus, new temporal data, e.g. updated temporal data, may be obtained throughout the shipping route. Additionally or alternatively, the new temporal data, e.g. updated temporal data, may be obtained prior to starting the shipping route.

Updated temporal data can be advantageous if an unexpected weather condition, such as wind or temperature, may lead to increased carbon emissions. The methods disclosed herein can then modify based on the unexpected weather conditions, or other conditions, to provide a new optimized route. Updated temporal data may be obtained at specific given points, for example designated points, along the shipping route. Updated temporal data may be obtained continuously, or generally continuously, along the shipping route.

The methods disclosed herein can, based on the updated temporal data, determine one or more routes which are optimized according to this disclosure. The one or more routes can be optimized by using database of routes associated with corresponding carbon emission parameters. The one or more routes can be optimized by applying a nearest neighbour algorithm based on the routes in the database, to find the nearest neighbour route(s) and corresponding carbon emission parameter(s). The nearest neighbour algorithm can store the available routes and can classify the new route or new route data based on a similarity measure. For example, the carbon emission parameters are collected and ranked. For example, the route with the lowest average carbon emission parameter is selected.

The one or more optimized routes can include a route with an updated trajectory and/or a route with a modified operation of a vessel (e.g. modified speed of the vessel). In one or more example methods, the operational input data comprises booking data and temporal data indicative of an environmental condition for a geographic area. In one or more example methods, the booking data comprises data indicative of one or more of: container equipment size, equipment type, commodity shipped, cost details, delivery time, source port, destination port, and bunker fuel consumption. In one or more example methods, the temporal data comprises one or more of a maritime parameter (such as a wave parameter and/or a current parameter), an air travel parameter and a weather parameter (such as a wind parameter and/or a temperature parameter). In one or more example methods, the temporal data comprises geolocation data.

The method 100 comprises determining S106, based the operational input data and a route optimization model, an optimized route set comprising a route parameter associated with a carbon emission parameter. In one or more example methods, the route optimization model is based on historical route data. In one or more example methods, the route optimization model is configured to determine an optimized route set based on the historical route data and/or operational input data.

The optimized route set may comprise, for each shipping route determined, a route parameter associated with a carbon emission parameter. The route parameter may comprise a route identifier labelling the shipping route. In one or more example methods, the route parameter comprises one or more of: a waypoint parameter, a distance parameter, an estimated time of arrival, and a set of intermediate stops. The route parameter may be for each route in the form of line projection from source to destination with a corresponding carbon emission parameter, miles and estimated time of arrival (ETA). The optimized route set may include a historical route, such as from the historical route data. The optimized route set may include one or more shipping routes that are different than a historical route, such as from the historical route data.

The carbon emission parameter may be seen as a parameter estimating the carbon emission for a give route. In one or more example methods, the carbon emission parameter comprises an estimate of carbon emission for the shipping route.

In one or more example methods, the determining S106 comprises determining S106A the carbon emission parameter and a confidence score associated with the carbon emission parameter. The confidence score may be seen as a feasibility score (e.g. calculated from historical data) to provide a probability of the carbon emission parameter being feasible for a given route.

In one or more example methods, the carbon emission parameter is indicative of a carbon dioxide, $CO_2$, emission. In some examples, the carbon emission parameter for a ship or a vessel, such as indicative of a total $CO_2$ emission on a shipping route, may be calculated based on the following formula: carbon emission parameter=(Average weight*Emissions of $CO_2$ in grams per ton per kilometer*distance)/(1000*1000) tons. For example, the average weight of a ship or vessel may be in the range from 100,000 tons to 300,000 tons, such as 200,000 tons. In one or more example methods, the carbon emission parameter in grams per ton per km may be in the range from 10 g per ton per km, 10 g/t/km, to 15 g per ton per km, 15 g/t/km. In one or more example methods, the average speed (such as cruising speed) may be in the range from 10 knots to 25 knots, such as 19 knots.

In one or more example methods the confidence score may be based on the operational parameter. In one or more example methods, the confidence score may be based on the carbon emission parameter. For example, the disclosed technique may be seen as a combined optimization with pattern mapping to estimate carbon emission parameter.

In one or more example methods, the determining S106 comprises determining S106B an operational parameter for the route parameter.

In one or more example methods, the operational parameter is indicative of or comprises a fuel consumption parameter and/or a time to destination parameter. In one or more example methods, the confidence score may be calculated based on the carbon emission parameter, fuel, and/or time. For example, the confidence score may be calculated based on the formula: confidence score=((carbon emission parameter*factor1)+(fuel*factor2)+(time*factor3)) where factor1+factor2+factor3=1, and * is a multiplication sign.

In one or more example methods, the determining S106 comprises determining S106C whether the operational parameter satisfies a first criterion. In one or more example methods, the first criterion may be based on a first threshold indicative of an operational constraint, e.g. for fuel consumption, e.g. for time, e.g. for cost.

In one or more example methods, the determining S106 comprises when it is determined that the operational parameter satisfies the first criterion, including S106D the route parameter in the optimized route set. In one or more example methods, the determining S106 comprises determining S106C whether the operational parameter satisfies a first criterion. In one or more example methods, the determining S106 comprises when it is determined that the operational parameter does not satisfy the first criterion (e.g. violating an operational constraint), including S106E the route parameter into a fine-tuning data set.

In one or more example methods, the first criterion is based on one or more operational constraints associated with the operational input data.

For example, based on operational parameters (such as cost, travel time, port combinations and capacity planning constraints), the disclosed method can provide an optimal route by ensuring reduced and/or low carbon emissions. In particular, the disclosed method can provide an optimal route by ensuring reduced and/or low carbon emissions as compared to a typical historical route. The disclosed route optimization model may utilise historical booking data which contains all possible routes taken in the past considering seasonality for accommodating route changes and deviations for respective time frame and intelligently utilises historical journey patterns covering all seasons to estimate optimal route and associated $CO_2$ emissions.

In one or more example methods, the determining S106 comprises determining S106F the optimized route set based on the updated temporal data.

The method 100 comprises outputting S108, based on the optimized route set, a result indicative of an optimized route. For example, the result may provide an optimal shipping route with least carbon emission under the obtained operational constraints. Extracted route may be based on historical shipping data and optimization containing operational constraints. This can be used to operate over low emission route. The system is capable to take geo-location data along with operational attributes to intelligently identify optimized route yielding less carbon emissions. The result indicative of the optimized route may be provided to an application programming interface. The disclosed technique may be seen as easy to adopt and provides an architecture that supports scalability to manage multiple concurrent requests for real time implementations.

In one or more example methods, the outputting S108 comprises determining S108A whether the carbon emission parameter satisfies a second criterion. For example the second criterion may be based on a second threshold for the carbon emission, such as based on a carbon emission budget. For example the carbon emission parameter for a shipping route satisfies the second criterion when the carbon emission parameter is below the second threshold. In one or more example methods, the determining S108 comprises when it is determined that the carbon emission parameter satisfies the second criterion, including S108B the route parameter into the result indicative of the optimized route. In one or more example methods, the determining S108 comprises determining S108A whether the carbon emission parameter satisfies a second criterion. In one or more example methods, the determining S108 comprises when it is determined that the carbon emission parameter does not satisfy the second criterion, including S108C the route parameter into a fine-tuning data set.

In one or more example methods, the outputting S108 comprises determining whether the confidence score associated with the carbon emission parameter satisfies a third criterion. For example the third criterion may be based on a third threshold for the carbon emission, to exclude the carbon emission parameter(s) having confidence score(s) that are low, such as below 0.9, such as below 0.8, such as below 0.7. For example the confidence score associated with the carbon emission parameter satisfies the third criterion when the confidence score is above the third threshold. In one or more example methods, when it is determined that the confidence score associated with the carbon emission parameter satisfies the third criterion, the route parameter is included into the result indicative of the optimized route.

In one or more example methods, when it is determined that the confidence score associated with the carbon emission parameter does not satisfy the third criterion, the route parameter is included into the fine-tuning data set.

In one or more example methods, the method 100 comprises obtaining S102 the historical route data (for example receiving and/or retrieving the historical route data). In one or more example methods, the historical route data comprises a time parameter. For example, historical route data may be used along with associative details, the route optimization model is applied to identify best route based on data patterns and constraints. The route optimization model may be seen as trying to identify candidate routes and estimates associated carbon emission under operational constraints like bunker cost, delivery time etc. As historical route data may come from vessel movements and/or navigations, the historical route data may be transformed and filtered by retaining observations with highest proximity with nearby port and navigational points. For example, historical data indicative of historical journey patterns covering many seasons may be used to estimate optimal route and associated carbon emission parameter, e.g. indicative of $CO_2$ emissions.

In one or more example methods, the obtaining S102 comprises pre-processing S102A historical input data to obtain the historical route data. In one or more example methods, the pre-processing S102A comprises transforming S102AA the historical input data to expand the historical route data. In one or more example methods, the pre-processing S102A comprises filtering S102AB the historical route data based on proximity. In one or more example methods, the pre-processing S102A comprises selecting S102AC one or more candidate routes based on delivery time and/or route leg information. For example, one or more candidate routes selected may only be the candidate routes where delivery time and route legs are relevant to the present shipment and not outlier(s).

In one or more example methods, the method 100 comprises pre-processing S103 the operational input data. In one or more example methods, based on the operational input data, the pre-processing comprises filtering the operational input data and arranging the operational input data in pair form, such as source-destination form.

In one or more example methods, a route or the shipping route includes one or more of a land shipping route, an air shipping route, and a water shipping route. In one or more example methods, the outputting S108 comprises providing S108D the result to a navigation system or a user of a navigation system.

In one or more example methods, after completion of the shipping (such as voyage), the optimized route set may be added to the historical route data.

FIG. 5 shows a block diagram of an exemplary electronic device 300 according to the disclosure. The electronic device 300 comprises memory circuitry 301, processor circuitry 302, and an interface 303. The electronic device 300 is configured to perform any of the methods disclosed in FIG. 4. In other words, the electronic device 300 is configured for optimizing a route or a shipping route.

The electronic device 300 is configured to obtain (such as via the interface 303, and/or the memory circuitry 301) operational input data comprising a source data element and a destination data element.

The electronic device 300 is configured to determine (e.g. using the processor circuitry 302), based on the operational input data and a route optimization model, an optimized route set comprising a route parameter associated with a carbon emission parameter. The route optimization model is based on historical route data.

The electronic device 300 is configured to output (e.g. using the processor circuitry 302, and/or the interface 303), based on the optimized route set, a result indicative of an optimized route.

The electronic device 300 may be, for example, a computer, a phone, a tablet, a laptop, or a combination thereof.

The processor circuitry 302 is optionally configured to perform any of the operations disclosed in FIG. 4 (such as any one or more of: S102, S102A, 102AA, S102AB, S102AC, S103, S104A, S106A, S106B, S106C, S106D, S106E, S106F, S108A, S108B, S108C, S108D). The operations of the electronic device 300 may be embodied in the form of executable logic routines (e.g., lines of code, software programs, etc.) that are stored on a non-transitory computer readable medium (e.g., the memory circuitry 301) and are executed by the processor circuitry 302.

Furthermore, the operations of the electronic device 300 may be considered a method that the electronic device 300 is configured to carry out. Also, while the described functions and operations may be implemented in software, such functionality may as well be carried out via dedicated hardware or firmware, or some combination of hardware, firmware and/or software.

The memory circuitry 301 may be one or more of a buffer, a flash memory, a hard drive, a removable media, a volatile memory, a non-volatile memory, a random access memory (RAM), or other suitable device. In a typical arrangement, the memory circuitry 301 may include a non-volatile memory for long term data storage and a volatile memory that functions as system memory for the processor circuitry 302. The memory circuitry 301 may exchange data with the processor circuitry 302 over a data bus. Control lines and an address bus between the memory circuitry 301 and the processor circuitry 302 also may be present (not shown in FIG. 5). The memory circuitry 301 is considered a non-transitory computer readable medium.

The memory circuitry 301 may be configured to store one or more programs comprising instructions in a part of the memory.

The memory circuitry 301 may be configured to store information, such as information related to operational input data, temporal data, historical route data, carbon emission parameters, a route optimization model, and a route or shipping route, in a part of the memory.

Embodiments of methods and products (electronic device, such as electronic device 300 shown in FIG. 5) according to the disclosure are set out in the following items:

Item 1. A method, performed by an electronic device, for optimizing a shipping route, the method comprising:

- obtaining (S104) operational input data comprising a source data element and a destination data element;
- determining (S106), based on the operational input data and a route optimization model, an optimized route set comprising a route parameter associated with a carbon emission parameter, wherein the route optimization model is based on historical route data; and
- outputting (S108), based on the optimized route set, a result indicative of an optimized route.

Item 2. The method according to item 1, the method comprising obtaining (S102) the historical route data.

Item 3. The method according to any of the previous items, wherein the determining (S106) comprises determining (S106A) the carbon emission parameter and a confidence score associated with the carbon emission parameter.

Item 4. The method according to any of the previous items, wherein the determining (S106) comprises determining (S106B) an operational parameter for the route parameter.

Item 5. The method according to any of the previous items, wherein the determining (S106) comprises:

- determining (S106C) whether the operational parameter satisfies a first criterion;
- when it is determined that the operational parameter satisfies the first criterion, including (S106D) the route parameter in the optimized route set.

Item 6. The method according to any of the previous items, wherein the determining (S106) comprises:

- determining (S106C) whether the operational parameter satisfies a first criterion;
- when it is determined that the operational parameter does not satisfy the first criterion, including (S106E) the route parameter into a fine-tuning data set.

Item 7. The method according to any of items 5-6, wherein the first criterion is based on one or more operational constraints associated with the operational input data.

Item 8. The method according to any of the previous items, wherein the operational input data comprises booking data and temporal data indicative of an environmental condition for a geographic area.

Item 9. The method according to item 8, wherein the booking data comprises data indicative of one or more of: container equipment size, equipment type, commodity shipped, cost details, delivery time, source port, destination port, and bunker fuel consumption.

Item 10. The method according to any of items 8-9, wherein the temporal data comprises one or more of a maritime parameter, an air travel parameter and a weather parameter.

Item 11. The method according to any of items 8-10, wherein the temporal data comprises geolocation data.

Item 12. The method according to any of the previous items, wherein the obtaining (S104) comprises obtaining (S104A) updated temporal data along the shipping route.

Item 13. The method according to item 12, wherein the determining (S106) comprises determining (S106F) the optimized route set based on the updated temporal data.

Item 14. The method according to any of the previous items, wherein the outputting (S108) comprises:

- determining (S108A) whether the carbon emission parameter satisfies a second criterion; and
- when it is determined that the carbon emission parameter satisfies the second criterion, including (S108B) the route parameter into the result indicative of the optimized route.

Item 15. The method according to any of items 1-13, wherein the outputting (S108) comprises:

- determining (S108A) whether the carbon emission parameter satisfies a second criterion; and
- when it is determined that the carbon emission parameter does not satisfy the second criterion, including (S108C) the route parameter into a fine-tuning data set.

Item 16. The method according to any of the previous items, wherein the historical route data comprises a time parameter.

Item 17. The method according to any of items 2-16, wherein the obtaining (S102) comprises pre-processing (S102A) historical input data to obtain the historical route data.

Item 18. The method according to item 17, wherein the pre-processing (S102A) comprises transforming (S102AA) the historical input data to expand the historical route data.

Item 19. The method according to any of items 17-18, wherein the pre-processing (S102A) comprises filtering (S102AB) the historical route data based on proximity.

Item 20. The method according to any of items 17-19, wherein the pre-processing (S102A) comprises selecting (S102AC) one or more candidate routes based on delivery time and/or route leg information.

Item 21. The method according to any of the previous items, the method comprising pre-processing (S103) the operational input data.

Item 22. The method according to any of the previous items, wherein the shipping route includes one or more of a land shipping route, an air shipping route, and a water shipping route.

Item 23. The method according to any of the previous items, wherein the outputting (S108) comprises providing (S108D) the result to a navigation system or a user of a navigation system.

Item 24. The method according to any of the previous items, wherein the carbon emission parameter comprises an estimate of carbon emission for the shipping route.

Item 25. The method according to any of the previous items, wherein the route parameter comprises one or more of: a waypoint parameter, a distance parameter, and an estimated time of arrival, and a set of intermediate stops.

Item 26. An electronic device comprising memory circuitry, processor circuitry, and an interface, wherein the electronic device is configured to perform any of the methods according to any of items 1-25.

Item 27. A computer readable storage medium storing one or more programs, the one or more programs comprising instructions, which when executed by an electronic device cause the electronic device to perform any of the methods of items 1-25.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-5 comprises some circuitries or operations which are illustrated with a solid line and some circuitries or operations which are illustrated with a dashed line. The circuitries or operations which are comprised in a solid line are circuitries or operations which are comprised in the broadest example embodiment. The circuitries or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly to be regarded in an illustrative rather than restrictive sense. The claimed disclosure is intended to cover all alternatives, modifications, and equivalents.

The invention claimed is:

1. A method, performed by an electronic device, for optimizing a shipping route, the method comprising:

obtaining operational input data associated with a sea journey, the operational input data comprising:
- a source data element and a destination data element;
- temporal data comprising a weather parameter and a maritime parameter; and
- booking data indicative of one or more route constraints;

obtaining historical data comprising a set of historical routes previously travelled by one or more ships;

determining, based on at least the source data element and the destination data element, and using a nearest neighbor algorithm, a first subset of the set of historical routes based on similarity to the sea journey;

inputting the operational input data and the first subset into a route optimization model, the route optimization model configured to determine an optimized route set comprising a plurality of routes, each route comprising a route parameter associated with a carbon emission parameter and a confidence score characterizing a feasibility of the route, the optimized route set determined based at least in part on the booking data and the temporal data;

outputting, by the route optimization model and based on the optimized route set, a result indicative of an optimized route, the route optimization model configured to output the result indicative of the optimized route based on the carbon emission parameters of the optimized route set;

updating the route optimization model using a fine-tuning dataset comprising (i) routes having carbon emission parameters that do not satisfy a carbon parameter criterion and (ii) routes with confidence scores that do not satisfy a confidence criterion;

during navigation of the sea journey along the optimized route by a ship:
- dynamically updating the optimized route by: (a) obtaining updated temporal data along the shipping route and (b) outputting, by the updated route optimization model and based on the updated temporal data, a result indicative of an updated optimized route comprising one or more parameters that update a trajectory of the optimized route while maintaining the carbon emission parameter below a particular threshold; and adjusting the navigation of the sea journey by the ship according to the updated optimized route.

2. The method of claim 1, wherein the confidence score is associated with the carbon emission parameter.

3. The method of claim 1, wherein determining the optimized route set comprises determining an operational parameter for the route parameter of each route.

4. The method of claim 3, further comprising:

determining whether the operational parameter satisfies a first criterion; and when it is determined that the operational parameter satisfies the first criterion, including the route parameter in the optimized route set.

5. The method of claim 3, further comprising:

determining whether the operational parameter satisfies a first criterion; and when it is determined that the operational parameter does not satisfy the first criterion, including the route parameter into a fine-tuning data set.

6. The method of claim 4, wherein the first criterion is based on one or more operational constraints associated with the operational input data.

7. The method of claim 1, wherein the booking data comprises data indicative of one or more of: container equipment size, equipment type, commodity shipped, cost details, delivery time, source port, destination port, and bunker fuel consumption.

8. The method of claim 1, wherein the temporal data further comprises one or more of: an air travel parameter, and geolocation data.

9. The method of claim 1, wherein outputting the result indicative of the optimized route comprises:

determining whether the carbon emission parameter satisfies a second criterion; and when it is determined that the carbon emission parameter satisfies the second criterion, including the route parameter into the result indicative of the optimized route.

10. The method of claim 1, wherein outputting the result indicative of the optimized route comprises:

determining whether the carbon emission parameter satisfies a second criterion; and when it is determined that the carbon emission parameter does not satisfy the second criterion, including the route parameter into a fine-tuning data set.

11. The method of claim 1, wherein the historical data comprises a time parameter.

12. The method of claim 1, wherein obtaining the historical data comprises pre-processing historical input data to obtain the historical data comprising the set of historical routes.

13. The method of claim 12, wherein the pre-processing comprises transforming the historical input data to expand the historical data.

14. The method of claim 12, wherein the pre-processing comprises filtering the historical data based on proximity, and/or selecting one or more candidate routes based on delivery time and/or route leg information.

15. An electronic device comprising memory circuitry, processor circuitry, and an interface, wherein the electronic device is configured to perform operations comprising:

obtaining operational input data associated with a sea journey, the operational input data comprising:

a source data element and a destination data element;

temporal data comprising a weather parameter and a maritime parameter; and booking data indicative of one or more route constraints;

obtaining historical data comprising a set of historical routes previously travelled by one or more ships;

determining, based on at least the source data element and the destination data element, and using a nearest neighbor algorithm, a first subset of the set of historical routes based on similarity to the sea journey;

inputting the operational input data and the first subset into a route optimization model, the route optimization model configured to determine an optimized route set comprising a plurality of routes, each route comprising a route parameter associated with a carbon emission parameter and a confidence score characterizing a feasibility of the route, the optimized route set determined based at least in part on the booking data and the temporal data;

outputting, by the route optimization model and based on the optimized route set, a result indicative of an optimized route, the route optimization model configured to output the result indicative of the optimized route based on the carbon emission parameters of the optimized route set;

updating the route optimization model using a fine-tuning dataset comprising (i) routes having carbon emission parameters that do not satisfy a carbon parameter criterion and (ii) routes with confidence scores that do not satisfy a confidence criterion;

during navigation of the sea journey along the optimized route by a ship:

dynamically updating the optimized route by: (a) obtaining updated temporal data along the shipping route and (b) outputting, by the updated route optimization model and based on the updated temporal data, a result indicative of an updated optimized route comprising one or more parameters that update a trajectory of the optimized route while maintaining the carbon emission parameter below a particular threshold; and adjusting the navigation of the sea journey by the ship according to the updated optimized route.

16. The method of claim 1, wherein the one or more parameters comprise at least one of: operational control variables, ship state variables, ship control variables, or ship sailing constraints.

17. The method of claim 16, wherein the ship control variables comprise at least one of: ship velocity or ship heading angle.

18. The method of claim 16, wherein the ship sailing constraints comprise at least one of: geometric constraints, land crossing constraints, or marine engine power constraints.

19. A system comprising one or more computers and one or more storage devices storing instructions that are operable, when executed by the one or more computers, to cause the one or more computers to perform operations comprising:

obtaining operational input data associated with a sea journey, the operational input data comprising:

a source data element and a destination data element;

temporal data comprising a weather parameter and a maritime parameter; and booking data indicative of one or more route constraints;

obtaining historical data comprising a set of historical routes previously travelled by one or more ships;

determining, based on at least the source data element and the destination data element, and using a nearest neighbor algorithm, a first subset of the set of historical routes based on similarity to the sea journey;

inputting the operational input data and the first subset into a route optimization model, the route optimization model configured to determine an optimized route set comprising a plurality of routes, each route comprising a route parameter associated with a carbon emission parameter and a confidence score characterizing a feasibility of the route, the optimized route set determined based at least in part on the booking data and the temporal data;

outputting, by the route optimization model and based on the optimized route set, a result indicative of an optimized route, the route optimization model configured to output the result indicative of the optimized route based on the carbon emission parameters of the optimized route set;

updating the route optimization model using a fine-tuning dataset comprising (i) routes having carbon emission parameters that do not satisfy a carbon parameter criterion and (ii) routes with confidence scores that do not satisfy a confidence criterion;

during navigation of the sea journey along the optimized route by a ship:

dynamically updating the optimized route by: (a) obtaining updated temporal data along the shipping route and (b) outputting, by the updated route optimization model and based on the updated temporal data, a result indicative of an updated optimized route comprising one or more parameters that update a trajectory of the optimized route while maintaining the carbon emission parameter below a particular threshold; and adjusting the navigation of the sea journey by the ship according to the updated optimized route.

* * * * *